United States Patent [19]
Kawasaki et al.

[11] Patent Number: 5,778,271
[45] Date of Patent: Jul. 7, 1998

[54] BAYONET MOUNT AND PHOTO-TAKING LENS BARREL FOR INTERCHANGEABLE LENS CAMERA SYSTEM

[75] Inventors: Toyotoshi Kawasaki; Shinichi Suzuki, both of Kawachinagano; Yoshiyuki Inoue, Izumi, all of Japan

[73] Assignee: Minolta Co., Ltd., Japan

[21] Appl. No.: 790,318

[22] Filed: Jan. 28, 1997

[30] Foreign Application Priority Data

Jan. 31, 1996 [JP] Japan .................. 8-015249

[51] Int. Cl.$^6$ ................................. G03B 17/00
[52] U.S. Cl. ................................. 396/532
[58] Field of Search ................ 396/529, 531, 396/532

[56] References Cited

U.S. PATENT DOCUMENTS 4,239,364 12/1980 Doi .......................... 396/531
4,420,239 12/1983 Yasuyuki et al. ........... 396/532
4,536,071 8/1985 Maekawa et al. .
4,659,203 4/1987 Niwa et al. .
4,924,249 5/1990 Aihara et al. ............... 396/532
5,274,413 12/1993 Nomura et al. ............. 396/529

*Primary Examiner*—Russell E. Adams
*Attorney, Agent, or Firm*—Burns, Doane, Swecker & Mathis, LLP

[57] ABSTRACT

An improved bayonet mount for removably attaching the photo-taking lens barrel to a camera body in an interchangeable lens camera system, which bayonet mount includes a body-side mount surface and a lens-side mount surface which have a plurality of stop members severally provided on each interior surface thereof and electrical contact elements severally provided on each interior side thereof. In the bayonet mount, one pair of the correspondent pairs of stop members which mutually engage when the lens barrel is attached to the camera body are disposed at positions which overlap the electrical contact elements in a radial direction on the mount surfaces.

11 Claims, 3 Drawing Sheets

BAYONET MOUNT AND PHOTO-TAKING LENS BARREL FOR INTERCHANGEABLE LENS CAMERA SYSTEM

BACKGROUND OF THE INVENTION

1. Field of the Invention

The present invention relates to a bayonet mount for removably attaching a photo-taking lens barrel to a camera body in an interchangeable lens camera system.

2. Description of the Related Art

Generally, the bayonet mount of interchangeable lens camera systems have stop members on the photo-taking lens barrel side and camera body side which are arranged at three locations centered on the optical axis of the photo-taking lens. Each of the stop members on the camera body side protrudes inward in a radial direction from the interior edge of the mount surface on the camera body, whereas each stop member on the photo-taking lens barrel side protrudes outward in a radial direction from the leading edge of the cylindrical member which extends along the optical axis of the lens from the interior edge of the mount surface on the lens side, so as to be positioned in parallel and removed from the mount surface. The correspondent stop members engage one another so as to attach the lens barrel on the camera body by shifting the phase of the stop member on the lens barrel side with the stop member on the camera body side such that both mount surfaces make contact, and subsequently rotating the lens barrel.

In general, a locking pin is provided on the mount surface on the body side to exert an elastic force in the direction extending at a right angle from said mount surface, and a locking hole is provided on the mount surface on the lens side such that the tip of the locking pin engages said locking hole when the lens barrel is attached at the proper position so as to both position the lens barrel in the rotation direction relative to the camera body and prevent the lens barrel from unintentionally rotating and coming off. Furthermore, a lock release button is provided on the camera body to release the locking pin from the mount surface, such that the lens barrel can be removed when the lens barrel is rotated after said lock release button is pressed.

On the other hand, a plurality of correspondent contact elements are provided on the circumference of the interior sides of the mount surfaces to allow current to flow to the internal lens actuation and the electrical circuits for autofocusing, exposure control and the like. Each correspondent contact elements is arranged so as to come into mutual contact when the photo-taking lens barrel is installed on the camera body, and are constructed such that the contact point of each correspondent contact elements are in mutual pressure contact when the lens barrel is installed by exerting a force on one contact element toward the other contact element.

When, for example, external force is applied to the lens barrel with the lens barrel installed on the camera body, some inclination is produced in the lens barrel which weakens the contact pressure between the contact elements of the camera body side and lens side, causing concern that there will be reduction of the engagement (meshing distance) of the locking pin and locking hole. Particularly when plastic materials are used for the bayonet mount to reduce the cost as well as the weight of the camera, there is concern that the engagement of the locking pin and locking hole as well as the contact pressure between the contact elements will change because the stop members are easily deformed. Furthermore, in regard to the power supply to the actuators for autofocusing, aperture adjustment, anti-shake and the like, there is concern of erroneous camera operation due to poor contact between contact points. Accordingly, it is very important to maintain the contact pressure between the aforesaid contact elements.

SUMMARY OF THE INVENTION

An object of the present invention is to provide an improved bayonet mount and photo-taking lens barrel for an interchangeable lens camera system, which eliminate the previously described disadvantages.

Another object of the present invention is to provide a bayonet mount and photo-taking lens barrel for an interchangeable lens camera system which are capable of maintaining contact pressure between the electrical contact elements of the lens side and the camera body side even when external force is applied to the photo-taking lens barrel.

Still another object of the present invention is to provide a bayonet mount and lens barrel for an interchangeable lens camera system which are capable of maintaining the engagement of the locking members of the photo-taking lens side and the camera body side even when external force is applied to the photo-taking lens barrel.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
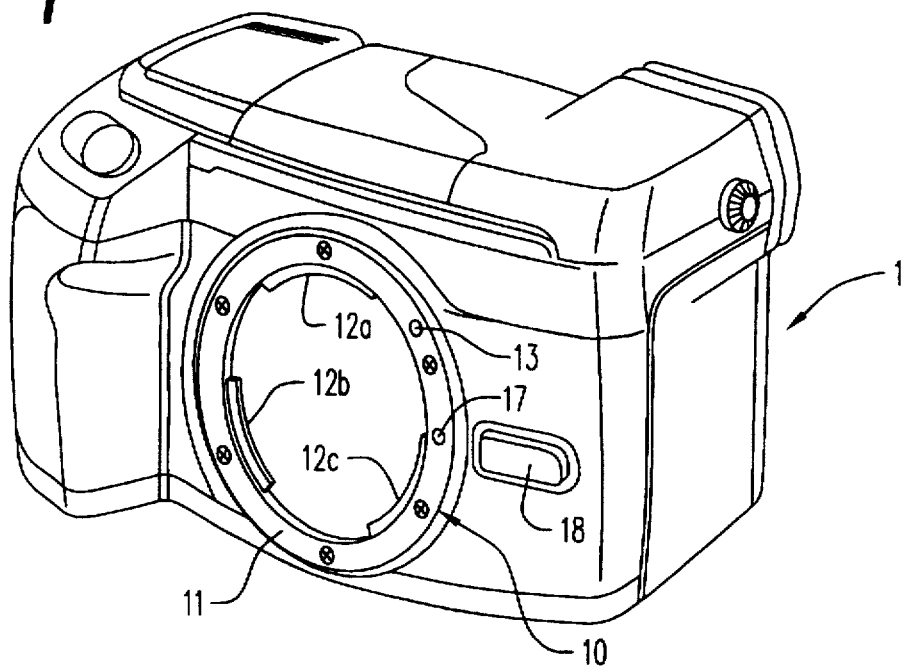
FIG. 1 is a perspective view of a camera body of an interchangeable lens camera system using the bayonet mount of the present invention.
Figure 2:
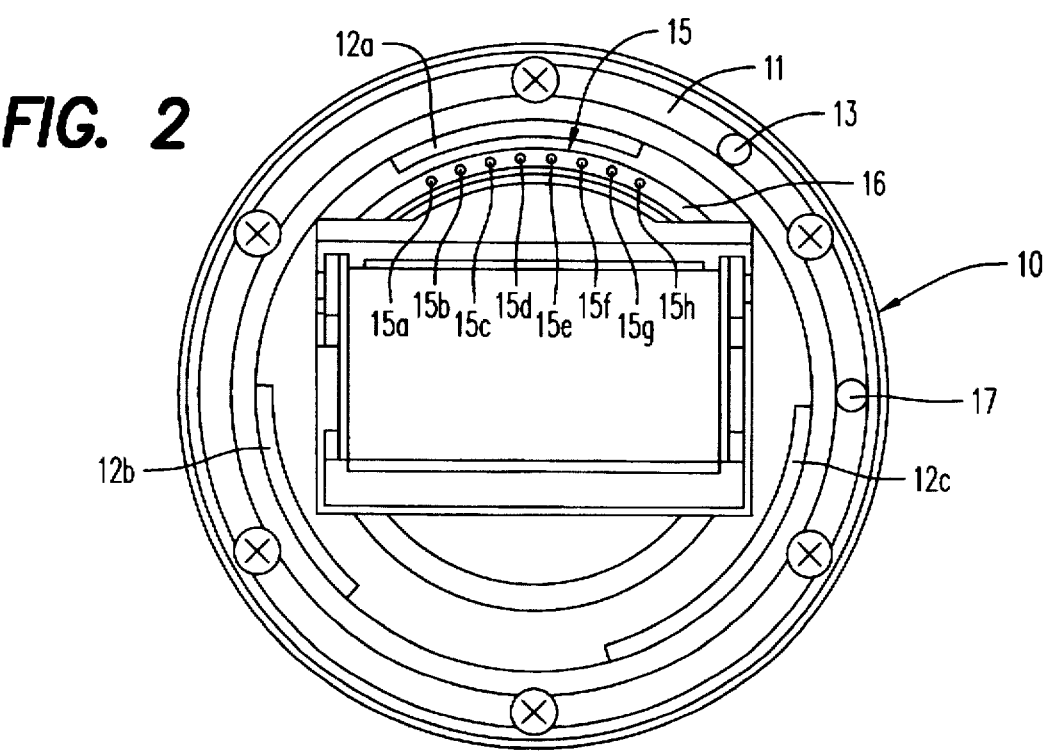
FIG. 2 is a front view of the body mount.
Figure 3:
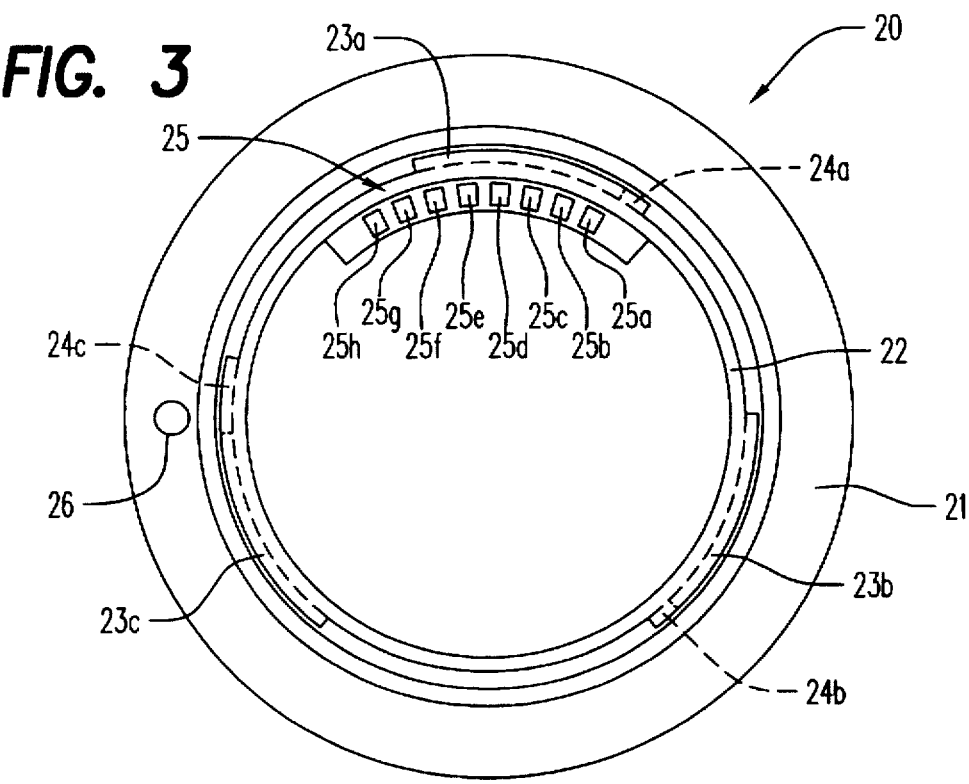
FIG. 3 is a front view of the lens mount.
Figure 4:
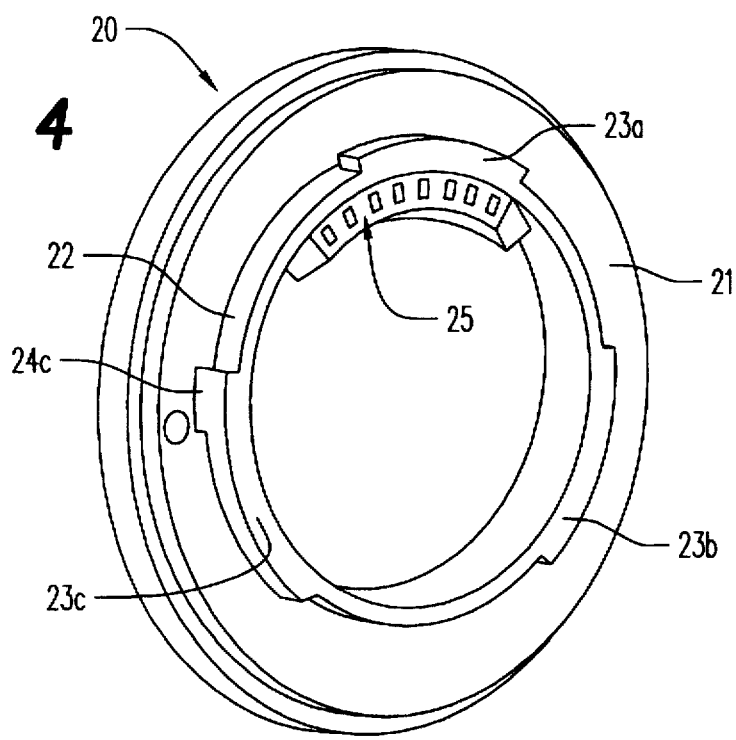
FIG. 4 is a perspective view of the lens mount.
Figure 5:
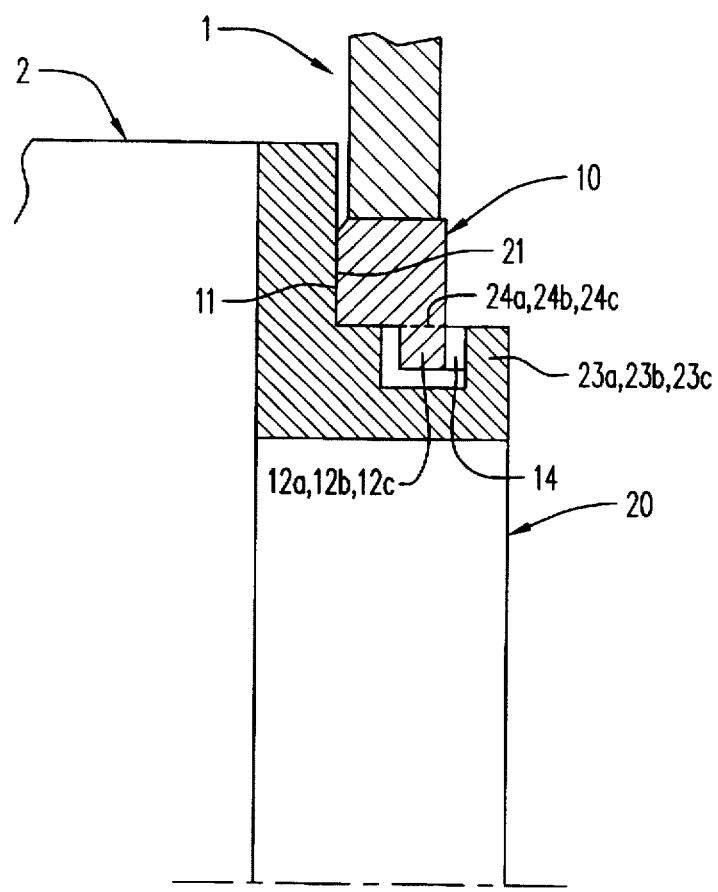
FIG. 5 is a partial perspective view showing the body mount and lens mount in an assembled state.

The preferred embodiments of the bayonet mount of the present invention used in an interchangeable lens camera system are described in detail hereinafter with reference to FIGS. 1 through 5. FIG. 1 is a perspective view of a camera body, FIG. 2 is a front view of the body mount, FIG. 3 is a front view of the lens mount, FIG. 4 is a perspective view of the lens mount, FIG. 5 is partial perspective view showing the body mount and lens mount in an assembled state.

In the drawings, reference number 1 refers to the camera body, reference number 2 (see FIG. 5) refers to the photo-taking lens barrel, reference number 10 refers to the body mount, and reference number 20 refers to the lens mount. The body mount 10 and lens mount 20 are respectively formed as ring-like members; reference number 11 refers to the mount surface of the body mount 10, and reference number 21 refers to the mount surface of the lens mount 20. In this camera system, the body mount 10 and the lens mount 20 are formed of plastic to reduce their weight.

Stop members 12a, 12b, and 12c are provided on the interior surface of the body mount 10 at positions slightly toward the interior from mount surface 11. On the other hand, cylindrical member 22 is provided on the interior surface of the lens mount 20, the leading edge of which is provided at three locations with stop members 23a, 23b, and 23c extending outwardly in radial directions on lens mount 20. The stop members 12a, 12b, 12c and stop members 23a, 23b, 23c are respectively formed at slightly different central angles so that the photo-taking lens barrel 2 is not erroneously installed top-to-bottom or left-to-right. Both mount surfaces 11 and 21 come into contact when the index mark (not illustrated) provided on lens barrel 2 is aligned with the position of index mark 13 provided on the mount surface 11 of the body mount 10, and the various stop members 12a, 12b, 12c and stop members 23a, 23b, 23c are respectively engaged when lens barrel 2 is rotated in a clockwise direction while in this state.

Connecting members 24a, 24b, and 24c are provided on the trailing edge of stop members 23a, 23b, 23c in the direction of rotation when installing the lens barrel 2, and connect with mount surface 21 and stop members 23a, 23b, 23c. Connecting members 24a, 24b, and 24c comprise a stopper so as to stop the lens barrel 2 at a position whereat the interior side edge surface (i.e., the edge surface on the anterior side in the rotation direction of the lens barrel of the connecting members) is in contact with the stop members 12a, 12b, 12c of the body mount 10. On the other hand, springs 14 are arranged at the back surface of the stop members 12a, 12b, 12c of the body mount 10. Both mount surfaces 11 and 21 are brought into contact by the springs 14 pushing the stop members 23a, 23b, 23c when the lens barrel 2 is installed on the camera body 1.

Camera body 1 and lens barrel 2 are provided with contact elements 15 and 25 arranged at predetermined positions on the circumference of the interior sides of mount surfaces 11 and 21 in radial directions. The contact elements 15 on the body 1 side comprise pins 15a through 15h which are constructed so as to be movable in the direction of the optical axis relative to the surface 16 on which are arranged the pins 15a through 15h. The pins 15a through 15h are caused to extend from surface 16 via a force applied in said direction.

Provided within the lens barrel 2 of the aforesaid camera system are a motor for autofocusing and aperture adjustment, a central processing unit (CPU), and memory. The former (motor) is connected to a drive power unit within the camera body 1, whereas the latter (CPU and memory) are connected to a power unit used by the circuits. In the mount 10 on the camera body 1 side shown in FIG. 2, the contact elements 15 comprise sequentially from the left side a power source element 15a for circuits of the lens barrel, power source element 15b for the motor of the lens barrel, circuit grounding element 15c for the motor of the lens barrel (the circuit grounding element is separated from circuit grounding element due to the difference in potential between the body and the lens when extensive current flows), circuit grounding element 15d of the lens barrel, serial data output element 15e, communication request element 15f (executes a communication request received from the camera body or lens barrel), serial clock element 15g (transmits communication clock data from the camera body to the lens), and serial data input element 15h, wherein the elements 15a through 15d related to the power unit are separated from the elements 15e through 15h related to communications.

The contact elements 25 on the lens barrel 2 side correspond to the various contact elements 15a through 15h on the camera body 1 side, and comprise sequentially from the right in FIG. 3 a circuit power source element 25a, motor power source element 25b, motor grounding element 25c, circuit grounding element 25d, serial data output element 25e, communication request element 25f, serial clock element 25g, and serial data input element 25h.

In the previously described construction, the circuit power elements 15a and 25a to communication request elements 15f and 25f overlap the stop member 12a and stop member 23a in the radial direction of each mount. In other words, the phase of these elements and these members in the peripheral direction of each mount is same. In this embodiment, when the serial data input elements 15h and 25h of each mount come into contact, a power source voltage is controllably supplied to the motor drive element, such that a current does not flow to the motor drive element on the lens barrel 2 side until the installation of said lens barrel 2 is completed.

The body mount 10 is provided with a locking pin 17 to position the lens barrel 2, whereas the lens mount 20 is provided with a locking hole 26 which accepts said locking pin 17. The locking pin 17 is movable in a direction perpendicular to the mount surface 11 and is caused to extend from mount surface 11 via a force. The locking pin 17 and locking hole 26 are disposed at positions which overlap the connecting member 24c of stop member 23c of lens mount surface 21 in the radial direction of the mounts. A lock release button 18 is provided on the front surface of the camera body 1 to release the locking pin 17 from the mount surface 11 when lens barrel 2 is removed from the camera body 1.

In the aforesaid construction, when the lens barrel 2 is rotated after the phase of the stop members 12a through 12c and 23a through 23c is shifted such that both mount surfaces 11 and 21 are brought into contact, the rotation of lens barrel 2 is stopped at a predetermined position via the action of connecting members 24a through 24c and is fixed at the position by the locking pin 17 engaging locking hole 26, and the installation of lens barrel 2 on camera body 1 is completed.

Thus, the contact pressure of the various contact elements is maintained even when an external force is applied to lens barrel 2 while said lens barrel 2 is installed on the camera body 1, because the contact elements 15a through 15h and 25a through 25h are arranged at positions which overlap the stop members 12a and 23a in the radial direction of the mounts, and the stop members 23a and mount surface 21 are connected via connecting member 24a. Particularly when it is difficult to position all contact elements at positions overlapped by the stop member due to the number of said contact elements in the aforesaid construction, accurate operation can be assured by having at least the contact elements 15b, 15c, 25b, 25c relating to supplying power to the actuators of the drive motor and the like of the lens barrel overlapped by stop members 12a and 23a in a radial direction on the mounts.

In the aforesaid construction, the locking pin 17 and locking hole 26 do not simply overlap the stop members 12c and 23c in a radial direction on the mounts, but are disposed at positions which are overlapped by the connecting member 24c of stop member 23c of the lens side mount surface 21 in a radial direction on the lens mount. Therefore, the locking pin 17 and locking hole 26 can be accurately engaged even when an external force is applied to the lens barrel 2 by strongly controlling displacement of this area.

Although the stop members are disposed so as to overlap the contact elements and locking pin with extreme effectiveness because the camera body mount 10 and lens mount 20 are formed of plastic material in the previously described construction, metallic mounts formed of stainless steel or the like may be adapted to the aforesaid arrangement. In such circumstances, the connecting members may be formed separately and attached between the mount surface 21 and stop members 23a through 23c because such mounts are generally formed by grinding using a grinder or the like.

Although the present invention has been fully described in connection with the preferred embodiments thereof with reference to the accompanying drawings, it is to be noted that various changes and modifications will be apparent to those skilled in the art. Such changes and modification are to be understood as being included within the scope of the present invention as defined by the appended claims unless they depart therefrom.

What is claimed is:

1. A bayonet mount for detachably installing a photo-taking lens barrel on a camera body in an interchangeable lens camera system, said bayonet mount comprising:

a body-side mount surface on the camera body;

a lens-side mount surface on the lens barrel;

a plurality of stop members severally provided on the interior surface of the body-side mount surface and on the interior surface of the lens-side mount surface, wherein the correspondent stop members of the body-side mount surface and stop members of the lens-side mount surface engage when the lens barrel is installed on the camera body so as to anchor the lens barrel to the camera body;

electrical contact portions severally provided on the interior side of the body-side mount surface and on the interior side of the lens-side mount surface, wherein each of said electrical contact portions is provided with a plurality of electrical contact elements which connect through mutual contact when the lens barrel is installed on the camera body; and wherein one pair among correspondent pairs of mutually engaging stop members is disposed at a position which overlaps at least the electrical contact elements for supplying electrical power to actuators within the lens barrel among said plurality of electrical contact elements in a radial direction on the mount surfaces.

2. A bayonet mount as claimed in claim 1, wherein said body-side mount surface and lens-side mount surface are formed of plastic.

3. The bayonet mount as claimed in claim 1, wherein said electrical connect portions are larger than said one pair among the stop members in the radial direction on the mount surfaces.

4. A bayonet mount for detachably installing a photo-taking lens barrel on a camera body in an interchangeable lens camera system, said bayonet mount comprising:

a body-side mount surface on the camera body;

a lens-side mount surface on the lens barrel;

a plurality of stop members severally provided on the interior surface of the body-side mount surface and on the interior surface of the lens-side mount surface, wherein the correspondent stop members of the body-side mount surface and stop members of the lens-side mount surface engage by rotating the lens barrel so as to anchor the lens barrel to the camera body;

locking members provided on the body-side mount surface and on the lens-side mount surface, respectively, which locking members mutually engage when the lens barrel is installed on the camera body so as to fix the lens barrel at a predetermined position; and wherein one pair among correspondent pairs of mutually engaging stop members is disposed at a position which overlaps the locking members in a radial direction on the mount surfaces;

wherein said stop members on the lens-side mount surface are disposed at positions separated from and parallel to the lens-side mount surface in the optical axis direction of the lens barrel, and are connected with the lens-side mount surface via connecting members on the trailing edge thereof in the rotational direction of the lens barrel, and wherein one of the connecting members is disposed at a position which overlaps said locking members in a radial direction on the mount surfaces when the lens barrel is installed on the camera body.

5. The bayonet mount as claimed in claim 3, wherein said body-side mount surface and lens-side mount surface are formed of plastic.

6. The bayonet mount as claimed in claim 3, wherein said stop members are provided at three locations on the body-side mount surface and the lens-side mount surface, and said connecting members are provided on all stop members of the lens-side mount surface, such that when the lens barrel is installed on the camera body, said connecting members come into contact with the respective stop members of the body-side mount surface so as to position the lens barrel at the predetermined position.

7. A photo-taking lens barrel for use in an interchangeable lens camera system, said lens barrel comprising:

a mount surface;

a plurality of stop members provided on the interior surface of the mount surface; an electrical contact portion provided on the interior side of the mount surface, which is provided with a plurality of electrical contact elements; and wherein one of said plurality of stop members is disposed at a position which overlaps at least the electrical contact elements for supplying electrical power to actuators within the lens barrel among said plurality of electrical contact elements in a radial direction on the mount surface.

8. The photo-taking lens barrel as claimed in claim 7, wherein said mount surface is formed of plastic.

9. The bayonet mount as claimed in claim 7, wherein said electrical connect portion is larger than said one of the stop members in the radial direction on the mount surface.

10. A photo-taking lens barrel for use in an interchangeable lens camera system, said lens barrel comprising:

a mount surface;

a plurality of stop members provided on the interior surface of the mount surface;

a connecting member which connects said mount surface with one of said stop members;

a locking member provided on the mount surface; and wherein said connecting member is disposed at a position which overlaps the locking member in a radial direction on the mount surface.

11. The photo-taking lens barrel as claimed in claim 9, wherein said mount surface is formed of plastic.

* * * * *